United States Patent
Santra et al.

(10) Patent No.: US 11,256,957 B2
(45) Date of Patent: Feb. 22, 2022

(54) POPULATION MODELING SYSTEM BASED ON MULTIPLE DATA SOURCES HAVING MISSING ENTRIES

(71) Applicant: CONDUENT BUSINESS SERVICES, LLC, Florham Park, NJ (US)

(72) Inventors: Bishal Santra, West Bengal (IN); Howard Mizes, Morrisville, NC (US); Kush Motwani, Mumbi (IN)

(73) Assignee: Conduent Business Services, LLC, Florham Park, NJ (US)

( * ) Notice: Subject to any disclaimer, the term of this patent is extended or adjusted under 35 U.S.C. 154(b) by 176 days.

(21) Appl. No.: 16/694,118

(22) Filed: Nov. 25, 2019

(65) Prior Publication Data
US 2021/0158090 A1    May 27, 2021

(51) Int. Cl.
G06K 9/62    (2006.01)
G06F 16/93    (2019.01)
G06N 3/04    (2006.01)

(52) U.S. Cl.
CPC .......... *G06K 9/6256* (2013.01); *G06F 16/93* (2019.01); *G06K 9/6247* (2013.01); *G06N 3/0445* (2013.01); *G06N 3/0472* (2013.01)

(58) Field of Classification Search
CPC .......................... G06N 3/0445; G06N 3/0472
See application file for complete search history.

(56) References Cited

U.S. PATENT DOCUMENTS

| | | |
|---|---|---|
| 7,283,904 B2 | 10/2007 | Benjamin et al. |
| 7,660,441 B2 | 2/2010 | Chen et al. |
| 7,698,345 B2 | 4/2010 | Samson et al. |
| 7,729,940 B2 | 6/2010 | Harvey et al. |
| 8,874,616 B1 | 10/2014 | Coffman et al. |
| 2008/0168027 A1 | 7/2008 | Kruger et al. |

FOREIGN PATENT DOCUMENTS

CN    110309907 A    * 10/2019

OTHER PUBLICATIONS

Li et al., "Using Bayesian latent Gaussian graphical models to infer symptom associations in verbal autopsies," arXiv:1711.00877v4, Jul. 24, 2019. (Year: 2019).*
O'Donoghue et al., "A Configurable Deep Network for High-Dimensional Clinical Trial," 2015 International Joint Conference on Neural Networks (IJCNN), 2015, pp. 1-8, doi: 10.1109/IJCNN.2015.7280841. (Year: 2015).*

(Continued)

*Primary Examiner* — Ross Varndell
(74) *Attorney, Agent, or Firm* — Jones Robb, PLLC

(57) ABSTRACT

A neural network is used to model to model the joint distribution of attributes across multiple health surveys. These multiple health surveys include large scale survey datasets and small scale survey datasets. The neural network model is trained using a combined dataset of the large scale survey datasets and the small scale survey datasets. The large scale survey datasets and the small scale survey datasets may include missing value indicators. The joint distribution of attributes modeled by the neural network model are the used to impute substitute values for the missing values to thereby create an output large scale dataset that does not include missing values.

11 Claims, 5 Drawing Sheets

(56) References Cited

OTHER PUBLICATIONS

Mocanu et al., "A topological insight into restricted Boltzmann machines," disclsos "RBMs and GRBMs are complete bipartite graphs," Mach Learn 104, 243-270 (2016). https://doi.org/10.1007/s10994-016-5570-z (Year: 2016).*
Shishvan et al., "Machine Intelligence in Healthcare and Medical Cyber Physical Systems: A Survey," in IEEE Access, vol. 6, pp. 46419-46494, 2018, doi: 10.1109/ACCESS.2018.2866049. (Year: 2018).*
Raghunathna, T. E. et al., "A Multivariate Technique for Multiply Imputing Missing Values Using a Sequence of Regression Models," Survey Methodology 27:1:85-95 (Jan. 2001).
Schenker, N. et al., "Improving on Analyses of Self-Reported Data in a Large-Scale Health Survey by Using Information from an Examination-Based Survery," Stat Med 29:5:533-545 (Feb. 28, 2010).
Unknown, "Introduction to Data Fusion," Nielsen Connections pp. 1-6 (2007).
Zheng, Yu, "Methodologies for Cross-Domain Data Fusion: An Overview," IEEE Transactions on Big Data 1:1:16-34 (Aug. 31, 2015).
Fischer, A. & C. Igel, "An Introduction to Restricted Boltzmann Machines," Progress in Pattern Recognition, Image Analysis, Computer Vision & Applications, 17th Iberoamerican Congress, CIARP 2012, Buenos Aires, Agentina, (Sep. 3-6, 2012) pp. 14-36.

* cited by examiner

POPULATION MODELING SYSTEM BASED ON MULTIPLE DATA SOURCES HAVING MISSING ENTRIES

FIELD OF THE INVENTION

Embodiments relate generally to the combining of data from multiple sources with missing values and modeling a population based on those multiple sources.

TECHNICAL BACKGROUND

A recurring challenge that public health agencies face is determining how best to achieve certain outcomes for their constituents—such as better health. One approach to guide policy decisions is population modeling. Population modeling can help give a better understanding and characterization of a target population and how their behaviors may change in response to various policies that could be implemented with the purpose to improve population health. Population modeling can also help with understanding the impact of policies, interventions, incentives on the population and the effect of those policies, interventions, incentives on outcomes of interest (e.g., heart disease rates) given that the population is diverse.

OVERVIEW

In an embodiment, a method includes training a first neural network model to model the joint distribution of attributes across multiple health surveys. These multiple health surveys include large scale survey datasets and small scale survey datasets. The first neural network model is trained using a combined dataset of the large scale survey datasets and the small scale survey datasets. The large scale survey datasets and the small scale survey datasets may include missing values. The joint distribution of attributes modeled by the neural network model are used to impute the missing values to thereby create an output combined dataset that does not include missing values.

In an embodiment, a method includes receiving heterogenous survey data comprising at least a first dataset having a first set of attributes and a second dataset having a second set of attributes. The first set of attributes and the second set of attributes have at least one common attribute, and at least one attribute that is not in common between the first set of attributes and the second set of attributes. The first dataset and the second dataset also having at least one missing entry. The method further includes training a Restricted Boltzmann Machine (RBM) having hidden nodes and visible nodes using the first dataset and the second dataset. The training includes, for a missing entry in at least one of the first dataset and the second dataset, estimating a value for the missing entry based on a first randomly selected sample made according to a first joint probability distribution of a value for the missing entry given a set of current visible node values and a set of current values for the hidden nodes.

In an embodiment, a system includes a first neural network model configured to model the joint distribution of attributes across multiple health surveys. The multiple health surveys include large scale survey datasets and small scale survey datasets. The first neural network model is trained using a combined dataset of the large scale survey datasets and the small scale survey dataset. The large scale survey datasets and the small scale survey dataset include missing values. The system also includes an imputation module to use the joint distribution of attributes modeled by the first neural network model to impute substitute values for the missing values to thereby create an output large scale dataset that does not include missing value.

DETAILED DESCRIPTION

In an embodiment, a neural network model to model the joint distribution of attributes across multiple health surveys. These multiple health surveys include large scale survey datasets and small scale survey datasets. The neural network model is trained using a combined dataset of the large scale survey datasets and the small scale survey datasets. The large scale survey datasets and the small scale survey datasets may include missing values. In other words, the survey dataset may have missing values that may result from, for example, different questions being part of the large scale survey dataset and the small scale survey dataset or non-responses by participants in the surveys. The joint distribution of attributes modeled by the neural network model are the used to impute values for the missing values to thereby create an output large scale dataset that does not include missing values.

Figure 1:
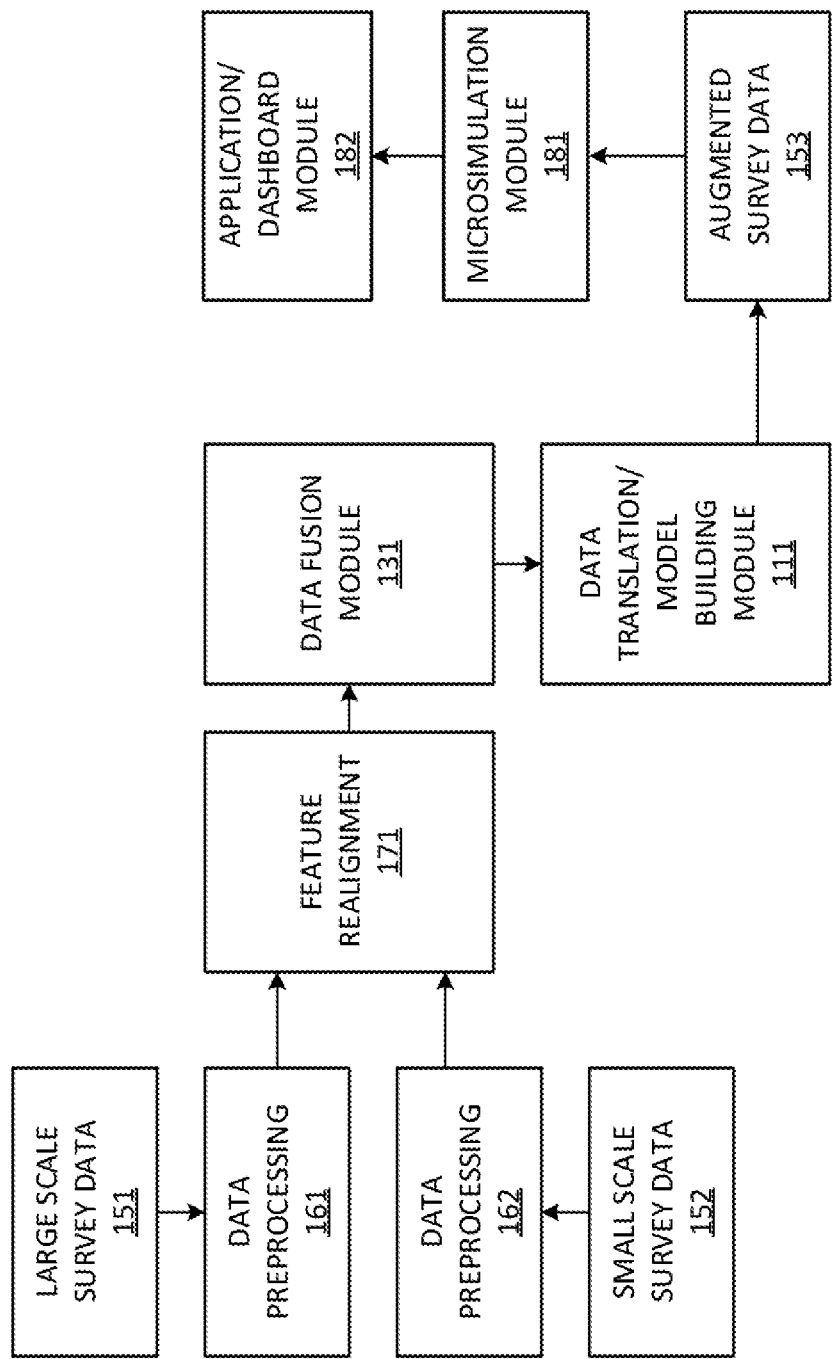
FIG. 1 is a block diagram illustrating an example population modeling system.

FIG. 1 is a block diagram illustrating an example population modeling system. In FIG. 1, system 100 comprises large scale survey data 151, small scale survey data 152, data preprocessing 161, data preprocessing 162, feature realignment 171, data fusion module 131, data translation/model building module 111, microsimulation module 181, application/dashboard module 182, and augmented survey data 153.

In FIG. 1, large scale survey data 151 is provided to data preprocessing 161. The output of data preprocessing 161 is provided to feature realignment 171. The output of feature realignment 171 is provided to data fusion module 131. Outputs of data fusion module 131 are provided to data translation/model building module 111, microsimulation module 181, and application/dashboard module 182. Outputs of data translation/model building module 111 are provided to microsimulation module 181, application/dashboard module 182. Data translation/model building module 111 also produces augment survey data 153. Augmented survey data 153 is provided to application/dashboard module 182.

Large scale survey data 151 is, for example, data produced by one or more surveys that are done at a national level. These surveys are typically done by, or at the behest of, Government agencies. Large scale survey data 151 is based on a survey where a very large sample population is questioned. One example of large scale survey data 151 is Behavioral Risk Factor Surveillance System (BRFSS). For BRFSS, around 500,000 people throughout the United States are surveyed each year. Questions asked in such large scale surveys are typically easily answerable and people usually have good and near accurate knowledge of the answers (e.g., Weight, Height, Age, etc.). The sample population being questioned may be very carefully designed through a method called stratified sampling such that it can be used to obtain distributions at national level, state level or county level.

Small scale survey data 152 is, for example, data produced by one or more surveys are designed by either government agencies or other private/public institutes to obtain data on particular attributes of the population. Typically, these attributes are such that their measurement is either not straightforward from an implementation or an economic point of view. This tends to limit the sampled population size of these surveys. Because of the limitation in sampled population size, it may not be a stratified sample where these surveys are representative of individuals, families and population subgroups at zip code and county level at the same time. Trying to capture the statistics of these attributes at every zip code level would make these surveys very expensive. Examples of such expensive to survey attributes are biomarkers such as Blood sugar levels and cholesterol levels—which require for measurement laboratory testing. One example of a small scale survey 152 is National Health and Nutrition Examination Survey (NHANES). NHANES surveys about 5,000 people each year which is around 10% of the number of people surveyed by the large scale survey data 151 BRFSS. In other words, in an embodiment, large scale survey data 151 will include 10× more people in the survey than small scale survey 152.

Feature realignment 171 processes the input data from multiple sources (e.g., large scale survey data 151 and small scale survey data 152) such that the responses are in a common space. Because different surveys have different objectives and hence different attributes of interest, not all attributes are measured/quantified with the same granularity within and across these multiple surveys. For example, a survey whose objective is to understand smoking habits will have detailed (and more) questions regarding smoking such as the number of cigarettes smoked daily and responses to which will be quantified into greater number of resolution levels. Whereas a more generic survey may have the smoking information in form of just a "yes/no" reply. The feature realignment module will bin the categories of the more granular survey question so that the granularity of the more granular survey question matches the granularity of the less granular survey question.

Data fusion module 131 includes a neural network that is trained to model the joint distribution of all the attributes across these multiple surveys. In operation, once the preprocessing of large scale survey data 151 and small scale survey data 152 by data preprocessing 161, data preprocessing 162, and feature realignment 171 is complete, all the survey data is merged together to create a combined dataset. When the same question is asked in the small scale dataset and the large scale dataset, there may be missing values denoting survey non-response. When a question is asked in the small scale survey dataset but not in the large scale survey dataset, there will be missing values for each surveyed person in the large scale surveyed dataset and for some surveyed people in the small scaled dataset who don't respond. When a question is asked in the large scale survey dataset but not in the small scale survey dataset, there will be missing values for each surveyed person in the small scale dataset and some surveyed people in the large scale dataset who don't respond.

For each row of the combined dataset where there are missing values, it is possible to substitute any response of the survey question for its value. However, some responses are expected to be more likely than other responses based on other values in any particular row. Data fusion module 131 operates to fit a parametric joint distribution that maximizes the likelihood of each missing survey response question in the combined dataset. In an embodiment, Data fusion module 131 is based on a single Restricted Boltzmann Machine (RBM) that is trained using all the survey datasets. The single RBM can be trained using rows with any number of missing entries.

Data translation/model building module 111 uses the joint distribution learned in the DataFusion Module, to impute the missing value entries, the attributes from the smaller focused surveys that were not asked in the large scale survey and the attributes from the large scale survey data that were not asked in the small scale survey. Output of this module can then serve as a basis to create machine learning models that estimate unknown attributes of a population from known attributes of a population. Known attributes of a population that may exist at the granularity of a zip code, county, state and the whole nation may include demographics such as age, gender, and ethnicity as well as socioeconomic status such as income and education. Unknown attributes of a population may include unhealthy behaviors (like smoking, alcohol intake etc.), biomarkers (like BMI and blood HbA1C level), and health states (like diabetes or heart disease).

Microsimulation module 181 uses the machine learning models which are the output of data fusion module 131 to simulate the attributes of an entire population representative of an area at the granularity of a zip code, a county, a state, or the nation as a whole. The attributes may include the demographics, the socioeconomic status, unhealthy behaviors, biomarkers, and health states. The excess medical burden associated with the population health states can also be calculated. The simulation population can be progressed in time based on these models to extract how unhealthy behaviors, biomarkers, and health states of the population change over time. The models may include the how unhealthy behaviors and biomarkers and thus health states may respond to various interventions and policies. Multiple simulations can be run over multiple zip codes, counties, and states to model the effective of various interventions and their associated costs over different geographical areas.

The result of running the multiple microsimulation models is the demographics, unhealthy behaviors, biomarkers, health states, and excess medical burden of a population and how these attributes changed over time. These attributes can be presented to an analyst with the application/dashboard module 182. The analyst can use the application/dashboard module to explore projected health care costs over various geographic areas and determine the best use of finite intervention resources. The application/dashboard module 182 also acts as a front-end for the analyst to run the microsimulation module 181.

Figure 2:
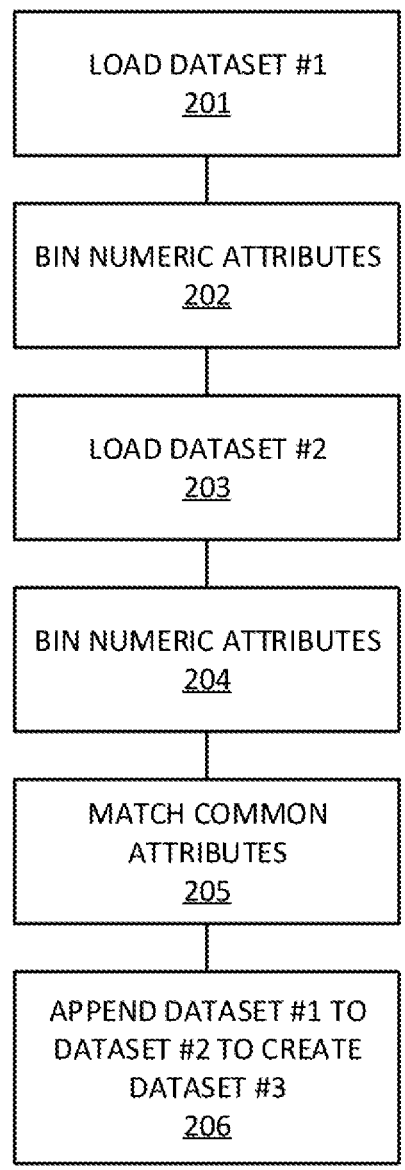
FIG. 2 is a flowchart illustrating a method of data preprocessing.

FIG. 2 is a flowchart illustrating a method of data preprocessing. The combining of multiple surveys begins with loading a first dataset #1 (201). The first dataset may contain only a subset of the information that is required to completely characterize an individual. For example, the first dataset may contain demographic, socioeconomic, behavior, and health information about individual respondents, but not labs tests such as A1C or cholesterol level. The first dataset typically contains one row for each individual surveyed. The first dataset may contain numeric attributes such as age or weight which can take any value on a continuum. The dataset may also contain categorical attributes such as race which take on a finite number of values. The individuals surveyed may not answer one or more questions so each row of the dataset may contain one or more missing values. This first dataset may be, for example, a phone survey where it is easy to reach many respondents and can be considered large survey dataset (e.g., large scale survey data 151.)

Numeric attributes are binned (202). For example, the Restricted Boltzmann Machine (RBM) algorithm requires all attributes to be categorical attributes and not numeric attributes. Therefore, the numeric attributes in the first dataset are binned into a finite number of categories—thus converting the numeric attributes to categorical attributes. For example, ages of adult respondents which vary between 18 and 100 can be binned into categories of young between 18 and 40, middle aged between 40 and 60, and old between 60 and 100.

Dataset #2 is loaded (203). The second dataset may, for example, contain a different subset of the information that is required to completely characterize an individual. The second dataset may, in addition to the demographic, socioeconomic, behavior, and health information about individual respondents, also contain, for example, biomarker information associated with lab tests such as the HbA1C level of the respondents. The set of respondents surveyed in the second dataset is not necessarily the same individuals surveyed in the first dataset. The second dataset may contain numeric attributes such as age or weight which can take any value on a continuum. The second dataset may also contain categorical attributes such as race which take on a finite number of values. The individuals surveyed may not answer one or more questions so each row of the second dataset may contain one or more missing values. The second dataset may be, for example, an in person survey where it is difficult to reach many respondents and may be considered a small survey dataset (e.g., small scale survey data 152.)

Numeric attributes are binned (204). For example, the numeric attributes of the second dataset are converted to categorical attributes in the same way as the first dataset. For those attributes that are the same between the first dataset and the second dataset, the same binning cutoffs are used.

Common attributes are matched (205). For example, the first dataset and the second dataset may not be obtained by the same surveyor on the same date. Therefore, common attributes between the first dataset and the second dataset are identified. Some attributes such as age are straightforward to align because age is typically represented in all surveys by years since birth. Other attributes such as activity level may be quantified as active or non-active in different ways. Based on the way the survey questions are described, an expert can determine the best way to label people as active or non-active in the two different surveys. Still other attributes may be collected with different granularity. For example, people of Chinese, Japanese, Korean, and Indian heritage may be classified as Asian in one survey while people of these different heritages may be classified separately in another survey. One approach to match attributes in this case is to bin the finer granularity survey into the coarser granularity so in both surveys the individuals are classified as Asian.

Append dataset #1 to dataset #2 to create dataset #3 (206). For example, if the first dataset consists of 500,000 rows corresponding to 500,000 individuals and the second dataset consists of 50,000 rows corresponding to 50,000 individuals, the third dataset will consist of 550,000 rows corresponding to the 550,000 unique individuals surveyed. Each column of dataset #3 will consist of questions asked either in the survey for dataset #1, the survey for dataset #2, or the question may be asked in both surveys. If a question is asked in both datasets #1 and #2, the response in dataset #3 will exist for each of the 550,000 rows except for nonresponses. If the question is asked in dataset #1 but not dataset #2, the response will exist for the first 500,000 rows but be missing for the last 50,000 rows. If the question is asked in dataset #2 but not in dataset #1, then the response will be missing for the first 500,000 rows.

After the data preparation step is complete, a one-hot encoded dataset may be generated from the combined dataset #3. The one-hot encoded dataset is a dataset that specifies (e.g., with a value such as 1) wherever the response to a particular question was answered in the affirmative for a particular category data exists, and with a value (e.g, with a value such as 0.) wherever the response to a particular question was answered in the negative for a particular category. For example, the single attribute such as age category young (18-40), middle aged (40-60), and old (60-100) will become three attributes: young age, middle age, and old age. A survey respondent who is 30 will have a 1 in the young age attribute, 0 in the middle age attribute, and 0 in the old age attribute. If the question was not answered by the respondent, or the question was not present in the combined dataset, then the value will be missing for all attributes in the one-hot encoded dataset.

Figure 3:
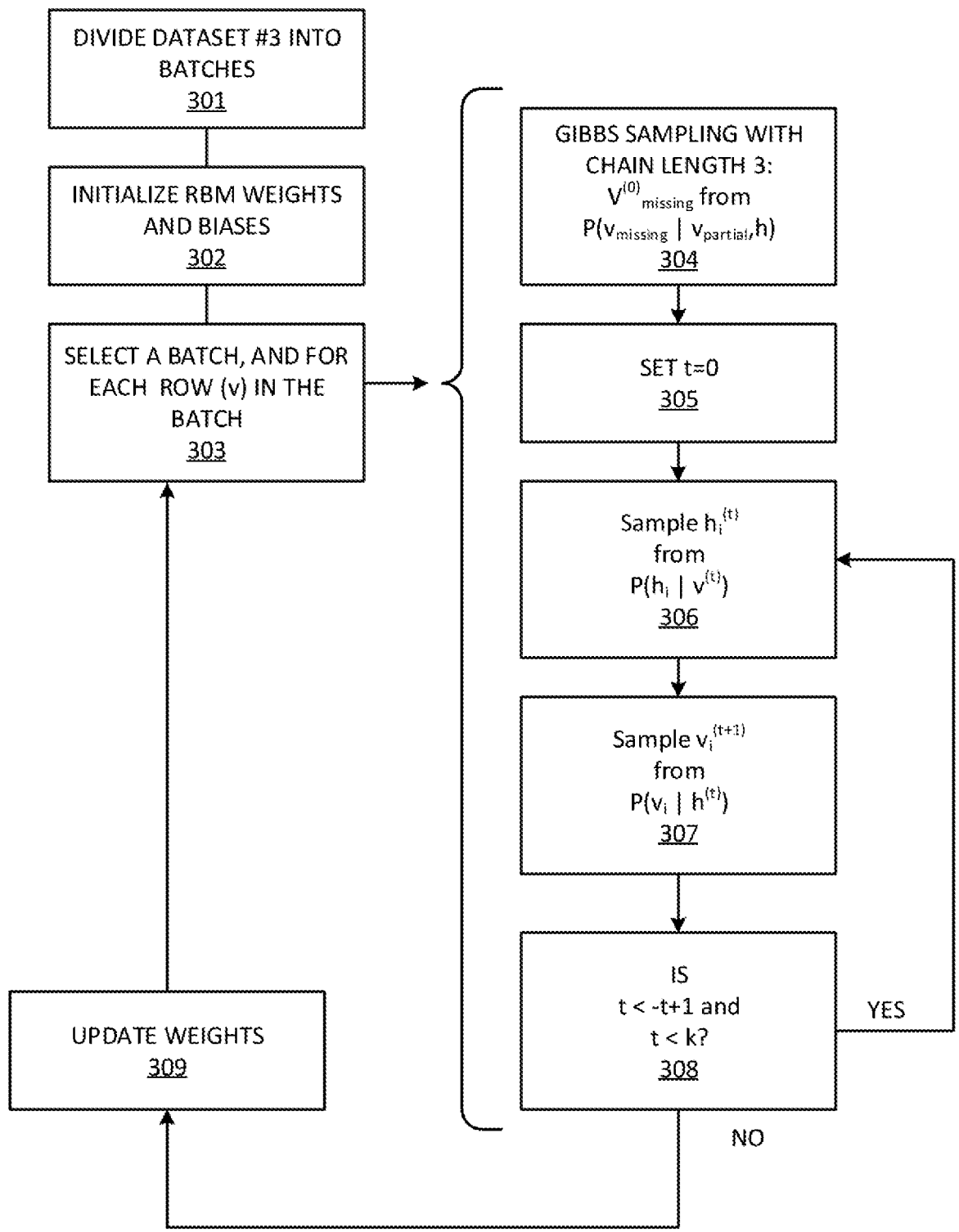
FIG. 3 is a flowchart illustrating a method of batch-wise training a neural network model.

Batch-wise training is used to train the RBM. The process for training the RBM is further detailed in FIG. 3. Generally, the process used by batch-wise training is described as k-fold Contrastive Divergence. However, because of the missing values, at least one additional step is required to perform the usual k-fold Contrastive Divergence algorithm.

Dataset #3 is divided into batches (301) where a batch is a set of rows in dataset #3. Dividing the data into a set of batches is done so that each batch can be processed individually in sequence to train the RBM in the k-fold Contrastive Divergence algorithm. A batch size may be, for example, 64 rows.

RBM weights and biases are initialized (302). For example, the weight parameters and the node parameters of the RBM may be initialized. Initializing all the weight parameters of the RBM to one and the node parameters to zero is one possible choice. Each node, v, in the visible layer of the RBM may correspond to a unique value of each categorical variable in the attributes of dataset #3. The number of hidden nodes is an adjustable parameter of the RBM and determines how much the dimensionality of the data is reduced. During the training of the RBM, a node will take on a value of zero if the respondent's answer did not correspond to that category for the current row of the dataset and 1 if the respondent's answer did correspond to that category for the current row of the dataset. In an embodiment, the RBM has 128 hidden nodes. Each edge connecting a visible node and a hidden node of the RBM is characterize by a weight parameter which is learned during the training of the RBM. In addition, each visible node and each hidden node is characterized by a parameter which will also be learned during training of the model.

A batch is selected and for each row (v) in the batch, the process in blocks 404-408 is performed (303). In other words, one of the batches of the training data from dataset #3 is used to incremental optimize (via blocks 304-308) the current state of the the RBM.

Gibbs sampling is performed (304). Some of the rows in the batch will have attributes where the survey question was not responded to or where the survey question was not present. The values in the one-hot encoded dataset will be neither 0 or 1 but will be missing. For these rows, an initial value will be determined from the initial conditions of the hidden notes and the visible nodes for which there is no missing value. In particular, missing data values for a row v are obtained by sampling the current values of the hidden nodes according to the probability distribution $p(v_{missing}|v_{partial},h)$, where $v_{partial}$ are the visible nodes where data does exist, and h is the current values of the hidden nodes.

After creating estimates of the missing data in box 304, Gibbs sampling is performed alternatively between the visible layer and the hidden layer k number of times, where k is a selected parameter of the algorithm. A counter t is set to zero (305). From the current values of the visible layer nodes, as well as the current parameters for the weights and the nodes, the next iteration of the hidden layer values are calculated for each row in the batch according to the probability distribution $p(h_i|v^{(t)})$ (306). Then from the current values of the hidden layer nodes as well as the current parameters for the weights and the nodes, the next iteration of the visible layer values are calculated for each row in the batch according to the probability distribution $p(v_i|h^{(t)})$ (307). If less than k iterations have been performed, flow proceeds to block 406 to perform another iteration. If the k iterations have been performed, flow proceeds to block 309.

The weight parameters and the node parameters are then incremental updated (309). This may be accomplished using the algorithm shown in Table 1. In Table 1, $w_{ij}$ are the parameters associated with the edges connecting the m visible nodes and the n hidden nodes, $b_j$ are the parameters associated with the m visible nodes, and $c_i$ are the parameters associated with the n hidden nodes. i and j index the visible nodes and the hidden nodes, respectively.

TABLE 1 for i = 1, ... , n, j = 1, ... , m do $\Delta w_{ij} \leftarrow \Delta w_{ij} + p(H_i = 1 | v^{(0)}) \cdot v_j^{(0)} - p(H_i = 1 | v^{(k)}) \cdot v_j^{(k)}$ $\Delta b_j \leftarrow \Delta b_j + v_j^{(0)} - v_j^{(k)}$ $\Delta c_i \leftarrow \Delta c_i + p(H_i = 1 | v^{(0)}) - p(H_i = 1 | v^{(k)})$ After the RBM is trained, the RBM is used to impute values for missing values. In an embodiment, the imputed missing values may be from the dataset used to train the RBM (e.g., dataset #3). In another embodiment, the imputed missing values may be from a different dataset than was used to train the model. In this instance, the different dataset may also be concurrently used to update the RBM's model parameters.

Figure 4:
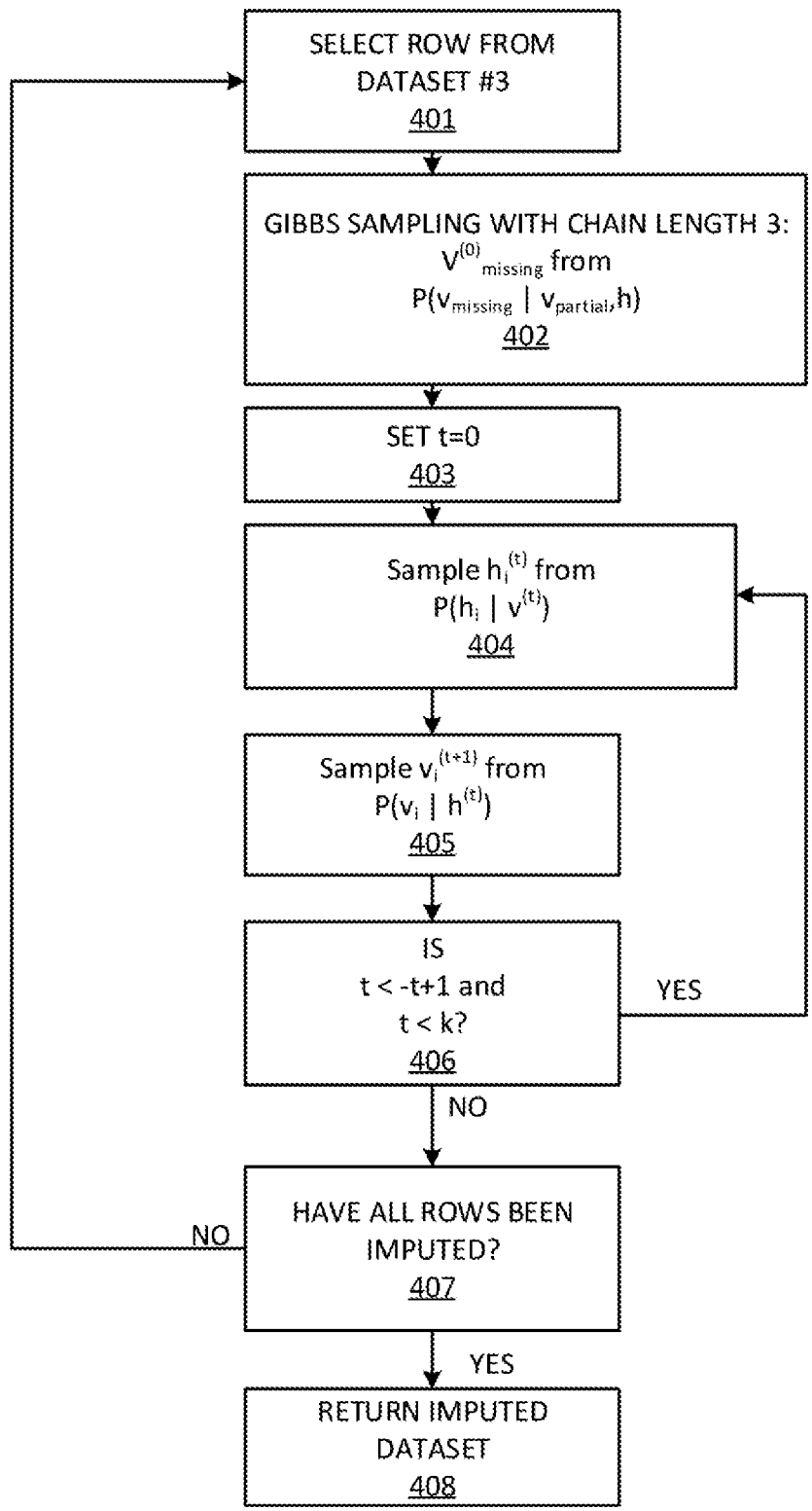
FIG. 4 is a flowchart illustrating a method of imputing values for missing data.

FIG. 4 is a flowchart illustrating a method of imputing values for missing data. A row is selected from dataset #3 (401). For each attribute that contains a missing value in the row, Gibbs sampling is performed in order to assign an imputed value (402). In particular, missing data values for the selected row v are obtained by sampling the current values of the hidden nodes according to the probability distribution $p(v_{missing}|v_{partial},h)$, where $v_{partial}$ are the visible nodes where data does exist, and h is the current values of the hidden nodes.

After creating estimates of the missing data in box 402, Gibbs sampling is performed alternatively between the visible layer and the hidden layer k number of times, where k is a selected parameter of the algorithm. A counter t is set to zero (403). From the current values of the visible layer nodes, as well as the current parameters for the weights and the nodes, the next iteration of the hidden layer values are calculated for each row in the batch according to the probability distribution $p(h_i|v^{(t)})$ (404). Then from the current values of the hidden layer nodes as well as the current parameters for the weights and the nodes, the next iteration of the visible layer values are calculated for each row in the batch according to the probability distribution $p(v_i|h^{(t)})$ (405). If less than k iterations have been performed, flow proceeds to block 404 to perform another iteration. If the k iterations have been performed, flow proceeds to block 407 (406). The weights and node parameters of the trained RBM ensure that the imputed value is the highest likelihood value expected for the missing value.

If all of the rows in the dataset have had their missing values imputed, flow proceeds to block 408. If not all of the rows in the dataset have had their missing values imputed, flow proceeds to block 401 to select another row. The imputed dataset is returned as an output (408).

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

Figure 5:
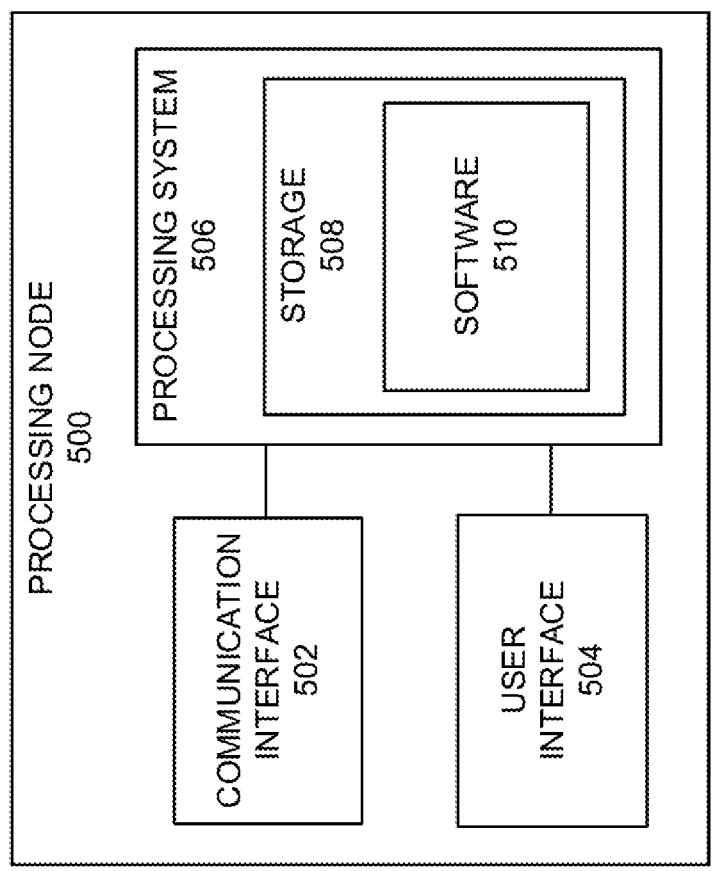
FIG. 5 illustrates a processing node.

FIG. 5 illustrates an exemplary processing node 500 comprising communication interface 502, user interface 504, and processing system 506 in communication with communication interface 502 and user interface 504. Processing node 500 is capable of paging a wireless device. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Implementations discussed herein include, but are not limited to, the following examples:

Example 1: A method, comprising: training a neural network model to model a joint distribution of attributes across multiple health surveys, where the multiple health surveys include a first scale survey datasets and a second scale survey datasets wherein the first scale survey datasets have at least 10 times the number of entries as the second scale survey datasets, the neural network model trained using a combined dataframe of the first scale survey datasets and the second scale survey datasets that include missing value indicators; and using the joint distribution of attributes modeled by the neural network model to impute substitute values for the missing value indicators to create an output first scale dataset that does not include missing value indicators.

Example 2: The method of example 1, wherein the neural network model is a Restricted Boltzman machine which includes a visible layer comprising visible layer nodes and a hidden layer comprising hidden layer nodes that are configured as a fully connected bipartite graph.

Example 3: The method of example 2, wherein training the neural network model includes: estimating, based on current values of the hidden layer nodes, first values for the visible layer nodes corresponding to the missing value indicators.

Example 4: The method of example 3, wherein the estimating first values for the visible layer nodes corresponding to the missing value indicators is based on sampling of the current values of the hidden nodes according to a first probability distribution function of $p(v_{miss}|v_{part},h)$, where $v_{miss}$ are current values of the visible layer nodes corresponding to the missing value indicators, $v_{part}$ are current values of the visible layer nodes not corresponding to the missing value indicators, and h are the current values of the hidden nodes.

Example 5: The method of example 3, wherein training the neural network model includes: alternately Gibbs sampling the visible layer and the hidden layer for k iterations, where k>1.

Example 6: The method of example 1, wherein imputing the substitute values for the missing value indicators includes: based on current values of the hidden layer nodes obtained from the trained neural network model, second values for the visible layer nodes corresponding to the missing value indicators.

Example 7: The method of example 5, wherein the estimating second values is based on random sampling of the current values of the hidden nodes obtained from the trained neural network model according to a second probability distribution function of $p(v_{miss}|v_{part},h)$, where $v_{miss}$ are current values of the visible layer nodes corresponding to the missing value indicators, $v_{part}$ are current values of the visible layer nodes not corresponding to the missing value indicators, and h are the current values of the hidden nodes.

Example 8: A method, comprising: receiving heterogenous survey data comprising at least a first dataset having a first set of attributes and a second dataset having a second set of attributes, the first set of attributes and the second set of attributes having at least one common attribute and at least one attribute that is not in common between the first set of attributes and the second set of attributes, the first dataset and the second dataset having at least one missing entry; and, training a Restricted Boltzmann Machine (RBM) having hidden nodes and visible nodes using the first dataset and the second dataset, the training comprising: for a missing entry in at least one of the first dataset and the second dataset, a value for the missing entry based on a first randomly selected sample made according to a first joint probability distribution of a value for the missing entry given a set of current visible node values and a set of current values for the hidden nodes.

Example 9: The method of example 9, further comprising: imputing substitute values for the at least one missing entry to create an output dataset that does not include the at least one missing entry.

Example 10: The method of example 9, wherein the RBM is configured as a fully connected bipartite graph.

Example 11: The method of example 10, wherein the first joint probability distribution is $p(v_{miss}|v_{part},h)$, where $v_{miss}$ are current values of the visible layer nodes corresponding to the at least one missing entry, $v_{part}$ are current values of the visible layer nodes not corresponding to the at least one missing entry, and h are the current values of the hidden nodes.

Example 12: The method of example 10, wherein training the RBM includes: alternately Gibbs sampling the visible layer and the hidden layer for k iterations, where k>1.

Example 13: The method of example 12, wherein imputing the substitute values for the at least one missing entry comprises: estimating, based on current values of the hidden layer nodes obtained from the trained RBM, second values for the visible layer nodes corresponding to the at least one missing entry.

Example 14: The method of example 13, wherein the estimating second values is based on sampling of the current values of the hidden nodes obtained from the trained neural network model according to a second probability distribution function of $p(v_{miss}|v_{part},h)$, where $v_{miss}$ are current values of the visible layer nodes corresponding to the at least one missing entry, $v_{part}$ are current values of the visible layer nodes not corresponding to the at least one missing entry, and h are the current values of the hidden nodes.

Example 15: A system, comprising: a neural network model operable to model a joint distribution of attributes across multiple health surveys, where the multiple health surveys include first scale survey datasets and second scale survey datasets wherein the first scale survey datasets have at least 10 times the number of entries as the second scale survey datasets, the neural network model trained using a combined dataframe of the first scale survey datasets and the second scale survey datasets that include missing value indicators; and an imputation module to use a joint distribution of attributes modeled by the neural network model to impute substitute values for the missing value indicators to create an output first scale dataset that does not include missing value indicators.

Example 16: The system of example 15, wherein the neural network model includes a visible layer comprising visible layer nodes and a hidden layer comprising hidden layer nodes that are configured as a fully connected bipartite graph.

Example 17: The system of example 16, wherein the neural network model training included, based on current values of the hidden layer nodes, estimating first values for the visible layer nodes corresponding to the missing value indicators.

Example 18: The system of example 17, wherein the neural network model training included estimating first values based on random sampling of the current values of the hidden nodes according to a probability distribution function of $p(v_{miss}|v_{part},h)$, where $v_{miss}$ are current values of the visible layer nodes corresponding to the missing value indicators, $v_{part}$ are current values of the visible layer nodes not corresponding to the missing value indicators, and h are the current values of the hidden nodes.

Example 19: The system of example 17, wherein the neural network model training included alternately Gibbs sampling the visible layer and the hidden layer for k iterations, where k>1.

Example 20: The system of example 15, wherein imputation of the substitute values for the missing value indicators included, based on current values of the hidden layer nodes obtained from the trained neural network model, estimating second values for the visible layer nodes corresponding to the missing value indicators.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method, comprising:
    training a neural network model to model a joint distribution of attributes across multiple health surveys, where the multiple health surveys include a first scale survey datasets and a second scale survey datasets wherein the first scale survey datasets have at least 10 times the number of entries as the second scale survey datasets, the neural network model trained using a combined dataset of the first scale survey datasets and the second scale survey datasets that include missing value indicators; and
    using the joint distribution of attributes modeled by the neural network model to impute substitute values for the missing value indicators to create an output first scale dataset that does not include missing value indicators, wherein
    the neural network model includes a visible layer comprising visible layer nodes and a hidden layer comprising hidden layer nodes that are configured as a fully connected bipartite graph, and
    training the neural network model includes estimating, based on current values of the hidden layer nodes, first values for the visible layer nodes corresponding to the missing value indicators.

2. The method of claim 1, wherein the neural network model is a Restricted Boltzman machine.

3. The method of claim 1, wherein the estimating first values for the visible layer nodes corresponding to the missing value indicators is based on sampling of the current values of the hidden nodes according to a first probability distribution function of $p(v_{miss}|v_{part},h)$, where $v_{miss}$ are current values of the visible layer nodes corresponding to the missing value indicators, $v_{part}$ are current values of the visible layer nodes not corresponding to the missing value indicators, and h are the current values of the hidden nodes.

4. The method of claim 1, wherein training the neural network model includes:
    alternately Gibbs sampling the visible layer and the hidden layer for k iterations, where k>1.

5. The method of claim 1, wherein imputing the substitute values for the missing value indicators includes:
    estimating, based on the current values of the hidden layer nodes obtained from the trained neural network model, second values for the visible layer nodes corresponding to the missing value indicators.

6. The method of claim 5, wherein the estimating second values is based on sampling of the current values of the hidden nodes obtained from the trained neural network model according to a second probability distribution function of $p(v_{miss}|v_{part},h)$, where $v_{miss}$ are current values of the visible layer nodes corresponding to the missing value indicators, $v_{part}$ are current values of the visible layer nodes not corresponding to the missing value indicators, and h are the current values of the hidden nodes.

7. A system, comprising:
    a neural network model operable to model a joint distribution of attributes across multiple health surveys, where the multiple health surveys include first scale survey datasets and second scale survey datasets wherein the first scale survey datasets have at least 10 times the number of entries as the second scale survey datasets, the neural network model trained using a combined dataset of the first scale survey datasets and the second scale survey datasets that include missing value indicators; and
    an imputation module to use a joint distribution of attributes modeled by the neural network model to impute substitute values for the missing value indicators to create an output first scale dataset that does not include missing value indicators, wherein
    the neural network model includes a visible layer comprising visible layer nodes and a hidden layer comprising hidden layer nodes that are configured as a fully connected bipartite graph, and
    the neural network model training included, based on current values of the hidden layer nodes, estimating first values for the visible layer nodes corresponding to the missing value indicators.

8. The system of claim 7, wherein the neural network model training included estimating first values based on random sampling of the current values of the hidden nodes according to a probability distribution function of $p(v_{miss}|v_{part},h)$, where $v_{miss}$ are current values of the visible layer nodes corresponding to the missing value indicators, $v_{part}$ are current values of the visible layer nodes not corresponding to the missing value indicators, and h are the current values of the hidden nodes.

9. The system of claim 7, wherein the neural network model training included alternately Gibbs sampling the visible layer and the hidden layer for k iterations, where k>1.

10. The system of claim 7, wherein imputation of the substitute values for the missing value indicators included, based on current values of the hidden layer nodes obtained from the trained neural network model, estimating second values for the visible layer nodes corresponding to the missing value indicators.

11. The system of claim 7, wherein the neural network is a Restricted Boltzman Machine.

* * * * *